United States Patent
Nasu et al.

(10) Patent No.: US 7,438,842 B2
(45) Date of Patent: Oct. 21, 2008

(54) METHOD OF MANUFACTURING RESIN MOLDING AND CHANGE-OVER DEVICE FOR CHANGING OVER BETWEEN HEATING MEDIUM AND RESIN MATERIAL IN PROCESS OF SECONDARY FORMING

(75) Inventors: Hidehisa Nasu, Oobu (JP); Akira Kuroyanagi, Chiryu (JP); Masato Ichikawa, Kariya (JP); Akira Sahashi, Nagoya (JP)

(73) Assignee: Denso Corporation, Kariya (JP)

( * ) Notice: Subject to any disclaimer, the term of this patent is extended or adjusted under 35 U.S.C. 154(b) by 792 days.

(21) Appl. No.: 11/090,855

(22) Filed: Mar. 25, 2005

(65) Prior Publication Data

US 2005/0212169 A1 Sep. 29, 2005

(30) Foreign Application Priority Data

Mar. 25, 2004 (JP) ............................. 2004-089188

(51) Int. Cl.
*B29C 45/73* (2006.01)
(52) U.S. Cl. ................... 264/161; 264/328.16; 425/547
(58) Field of Classification Search ................. 264/161, 264/328, 16, 406; 425/547
See application file for complete search history.

(56) References Cited

U.S. PATENT DOCUMENTS 7,300,274 B2 * 11/2007 Nasu et al. .................. 425/547

2003/0111765 A1 6/2003 Ichikawa et al.
2005/0212176 A1 * 9/2005 Nasu et al. ............. 264/328.16

FOREIGN PATENT DOCUMENTS

JP 2003-245980 9/2003

* cited by examiner

*Primary Examiner*—Jill L Heitbrink
(74) *Attorney, Agent, or Firm*—Harness, Dickey & Pierce, PLC (57) ABSTRACT

The change-over device changes over, to one of three passages, between the runner groove connected to the injection nozzle and the communicating groove communicated with the mold side passage. At the first position, the second passage 372 is communicated with the communicating groove and the temperature of a flow of hot air is measured by the thermocouple and the flow is discharged into the atmosphere. At the second position, the runner groove and the communicating groove are communicated with each other when the runner groove and the communicating groove are open to the second passage 371 and resin material is injected into the mold. At the third position, the material in the injection passage and the material in the runner groove are deposited to each other when the injection passage is shut off from the communicating passage and the third passage 374 is communicated with the runner groove.

18 Claims, 9 Drawing Sheets

METHOD OF MANUFACTURING RESIN MOLDING AND CHANGE-OVER DEVICE FOR CHANGING OVER BETWEEN HEATING MEDIUM AND RESIN MATERIAL IN PROCESS OF SECONDARY FORMING

BACKGROUND OF THE INVENTION

1. Field of the Invention

The present invention relates to a method of manufacturing a molding of resin in which a large number of primarily formed resin moldings are secondarily formed at the same time and a passage for injecting resin material is heated, before the resin material is injected, in the process of secondary forming. The present invention also relates to a change-over device for changing over between the heating medium and the resin material in the process of secondary forming.

2. Description of the Related Art

When a hollow resin molding is manufactured and, for example, when an intake manifold for vehicle use is manufactured, it is common that the intake manifold is worked by secondary forming after primary forming has been completed. In this case, the manufacturing process is executed as follows. A primary molding, which has been manufactured to be divided into a plurality of pieces in the process of primary forming, is set in a mold used for secondary forming. Then, the divided primary moldings are butted to each other, and a passage for resin material is formed in the joint portion in which the divided primary moldings are butted to each other. When resin material used for secondary forming is injected into the passage, the intake manifold, which is a resin molding, can be integrally formed.

In the case where the resin molding is an intake manifold, the following problems have been encountered. As the passage formed in the primary molding is long, when secondary forming is conducted at the normal temperature on the primary molding which has already been cooled and solidified, the injected resin material used for secondary forming is quickly cured and the deposition property of the resin material is deteriorated. Accordingly, the deposition strength is lowered.

In order to solve the above problems and enhance the deposition strength, it is conventional to adopt a method in which resin material is injected after only the surface of the joint portion of the primary molding to be joined has been heated. This method is disclosed in the official gazette of JP-A-2003-245980.

According to this method, for example, the resin molding is an intake manifold, and a passage for injecting the resin material for secondary forming is formed in the joint portion of the primary molding, which is butted in the mold of secondary forming in the peripheries of the pipe portion and surge tank portion of the intake manifold. In one end portion of the intake manifold, for example, at one position in one portion of the surge tank, an inlet used for injecting a heating medium is provided. At the other end portion, for example, at an end portion of one pipe, one resin material injecting port is provided. When a heating medium is made to flow into the passage from the inlet used for injecting the resin material before the resin material is injected, the heating medium is sent onto the entire circumference of the passage so that the surface of the joint portion can be heated. After the heating medium has flowed onto the entire circumferential face of the passage, the flow of the heating medium is stopped, and the resin material for secondary forming is injected from the inlet into the thus heated passage.

Due to the foregoing, the primary molding, which has been divided into a plurality of pieces, can be joined by the uniformly heated resin material. Accordingly, the deposition strength can be prevented from being deteriorated.

However, in the forming machine described in the above patent document, the outlet of the heating medium is also used as an inlet of the resin material. Therefore, the temperature of the inlet of the resin is lowered by the heating medium in some cases. For example, when the temperature of the nozzle of the injection molding machine arranged at the inlet is lowered, the fluidity of the resin is deteriorated immediately after the start of injection.

Accordingly, it is desired to prevent the heating medium from flowing to the inlet of the resin material.

According to the method disclosed in the above patent document, as the passage for the resin material is long and, further, the outlet of the heating medium is also used as an inlet of the resin material, injection of the resin material for secondary forming, which is conducted after the heating medium has flowed into the passage, is delayed. When the injection time of injecting the resin material is delayed, even if the passage is heated, a portion of the injected resin material is cured before the other portions are cured, and the deposition property of the resin material is deteriorated and the deposition strength is lowered.

Therefore, it is desired that the resin material can be injected at a temperature in a uniform temperature range when a change-over cycle for changing over between the inflow of the heating medium and the injection of the resin material is shortened.

Especially when a large number of parts are secondarily formed, the injecting time of each part is different because the lengths of the joining portions of a plurality of primary moldings are different, that is, lengths of the flow of the resin are different. In this case, concerning the parts, the flow lengths of which are short, in order to prevent the resin material from overflowing, the injecting of the resin material into the parts must be finished while the resin material is being made to flow into the parts, the flow lengths of which are long. Therefore, it is necessary to provide a change-over device, which is different from the change-over device of the long passage, the flow length of which is long, in the short passage of the short flow length. In this case, it is necessary for the resin material not to be left in the change-over device at the time of releasing the mold. This is a problem to be solved.

SUMMARY OF THE INVENTION

The present invention has been accomplished to solve the above problem. It is an object of the present invention to provide a method of manufacturing a molding of resin and a change-over device for changing over between a heating medium and resin material, characterized in that: when a large number of primary moldings are simultaneously subjected to secondary forming, a heating medium is prevented from flowing into an injecting port so that the deposition property of the resin material can be enhanced and a change-over cycle time for changing over between the inflow of the heating medium and the injection of the resin material can be shortened; and no dregs of the resin material are left in the mold at the time of releasing the mold.

In order to accomplish the above object, the method of manufacturing a molding of resin of the present invention is executed as follows.

According to the first aspect of the present invention, in a plurality of moldings which are divided, joint portions for joining the plurality of the divided primary moldings are formed, and passages for injecting the resin material for secondary forming are formed in the joining portions which are joined. The plurality of the thus divided primary moldings are set in the mold for secondary forming, and the heating medium and the resin material for secondary forming are selectively injected into the passage for the resin material for secondary forming.

This method of secondary forming is executed as follows. Before the resin material is injected into the passage in the mold, a heating medium flowing step is conducted in which the heating medium is made to flow into the passage so as to heat the passage and then the resin material injecting step is conducted in which the resin material is injected into the passage. After the completion of the resin material injecting step, a runner cut step is conducted in which the resin material in the mold is cut off and the dregs of the resin material, which have been left when the resin material in the mold was cut off, are connected to the resin material charged in the runner connected to the injection nozzle.

Accordingly, when the heating medium flowing step is conducted, at the time of injecting the resin material, the passage in the mold can be heated before injecting the resin material. Therefore, it is possible to uniformly cure the resin material without suddenly curing the resin material. Therefore, the deposition property of the resin material can be enhanced and the deterioration of the deposition property can be prevented.

When the runner cut step is conducted, the dregs of the resin material left in the mold are connected to the dregs of the resin material left in the runner on the injection nozzle side. Therefore, the dregs of the resin material can be easily removed at the time of releasing the mold.

According to the second aspect of the present invention, in addition to the first aspect, after the heating medium has been made to flow into the passage, the temperature of a portion in the neighborhood of the discharge port for the heating medium, which has been heated by the heating medium, can be controlled when the temperature is detected, for example, by a sensor such as a thermocouple. Therefore, when the temperature of the outlet of the heating medium is raised to a predetermined temperature, the resin material injecting step can be immediately executed. When the temperature is controlled, the cycle time can be shortened, and the injected resin can be uniformly cured without being suddenly cured, so that the deposition property of the resin material can be enhanced, and the deterioration of the deposition strength of the resin material can be prevented.

Further, according to the third aspect of the present invention, the passage can be changed over by a change-over device which selectively changes over between the inflow of the heating medium and the injecting of the resin material. This change-over device is arranged at a position close to the injecting port for injecting the resin material for secondary forming on the opposite side to the flowing port for the heating medium. Therefore, it is possible to change over after the heating medium has been made to flow in and the temperature of the mold for secondary forming has been controlled. Accordingly, the cycle time in each step can be shortened, and the resin material of secondary forming can be injected in a predetermined temperature range. Therefore, the deposition property of the resin material can be enhanced and the deterioration of the deposition strength can be prevented.

According to the fourth aspect of the present invention, the change-over device for changing over the heating medium and the resin material to manufacture a molding of resin is operated as follows. In a plurality of primary moldings which are divided, the joining joint portions are respectively formed, and the pipe-shaped passages are formed on the joining faces. When the plurality of primary moldings which are divided are butted against each other, the respective pipe-shaped passages are formed into a passage in which the resin material for secondary forming is charged. The heating medium is made to flow from one side of this passage so that the passage can be heated by the heating medium. After that, the resin material for secondary forming is injected from the other side of the passage.

On the other hand, the change-over device is arranged between the runner, which is connected to the injection nozzle, and the passage in the mold. This change-over device includes: a rotary valve body having an injection passage; a rotary lever for rotating the rotary valve body; and a drive mechanism for rotating the rotary lever.

The rotary valve body includes: a temperature sensor for measuring a temperature of the heating medium; a heating medium connecting passage having a discharging passage of discharging the heating medium; an injection passage for injecting the resin material into the mold; and a runner connecting passage for connecting the runner on the injection nozzle side with the injection passage at a position where the runner connecting passage is not connected with the passage in the mold.

The change-over device is rotated so that the heating medium connecting passage can be selectively arranged at either the position where the heating medium connecting passage is opposed to the passage, the position where the injection passage is opposed to the passage or the position where the runner connecting passage is connected to the runner on the injection nozzle side.

Under the condition that the heating medium flows in, the heating medium connecting passage is arranged at a position where the heating medium connecting passage is opposed to the passage in the mold. After the heating medium has heated the passage, it is discharged outside the mold through the heating medium discharge passage.

Under the condition that the resin material is injected, the injection passage is communicated with the passage in the mold, and the injected resin material is injected. Due to the foregoing, the resin material for secondary forming is charged into the passage.

Further, after the resin material has been injected, the rotary valve body is rotated to a position where the runner connecting passage is opposed to the runner connected to the injection nozzle, and the dregs of the resin material left in the injection passage are joined to the resin material injected from the injection nozzle and left in the runner.

Accordingly, after the injection passage of the resin material for secondary forming has been heated by the heating medium, the resin material for secondary forming is injected while a predetermined temperature is being maintained. Therefore, the resin material can be injected after the temperature of the passage has been raised to a predetermined temperature. Consequently, in the same manner as that of the first aspect of the present invention, the deposition property of the resin material can be enhanced and the deterioration of the deposition strength can be prevented.

Further, between the flowing action of the heating medium and the injecting action of the resin material, it is possible to conduct a change-over action for selectively changing over between the heating passage and the resin material passage with respect to the passage. Therefore, each action of secondary forming can be easily controlled, and the cycle time can be shortened.

Further, by the second change-over operation conducted in the change-over device, the dregs of the resin material in the change-over device are joined to the dregs of the resin material injected from the injection nozzle. Therefore, the dregs of the resin material can be easily removed from the change-over device at the time of releasing the mold. Further, as the rotary lever for driving the rotary valve body is composed of a link mechanism, a heavy load necessary for cutting the resin material in the mold can be given by a light operational force.

Further, according to the fifth aspect of the present invention, when this change-over device is attached to one end on the short passage side in the case of secondarily forming a large number of primary moldings at the same time, while the resin material is being injected in a long passage over a long period of time, the secondary forming can be finished in a short passage. Therefore, even when the injecting time of the long passage is different from the injecting time of the short passage, a large number of parts can be secondarily formed with a high efficiency at the same time without causing an overflow of the resin material.

According to the sixth aspect of the present invention, the change-over device is arranged at a position close to the injecting port for the resin material into the forming mold. The change-over device includes: a valve support body for dividing the mold side passage and the injecting side passage; and a valve body capable of moving in the valve support body.

The resin material injected from the injecting side is injected into the mold side passage of the forming mold under the condition that the injecting side passage and the mold side passage are communicated with each other by the first passage when the valve body is moved by being changed-over by the change-over device.

Under the condition that the valve body is moved by the change-over device and the second passage is communicated with the mold side passage, the second passage is shut off from the injecting side passage. Therefore, the heating medium flows from the mold side passage to the second passage and further flows into the discharge passage and discharges outside the mold.

Due to the foregoing, the heating medium does not flow to the injecting side passage and discharges outside the mold. Therefore, the heating medium does not reach the injection nozzle. Accordingly, even when the resin material is injected from the injection nozzle immediately after the heating medium has flowed in, a temperature drop is not caused by the heating medium, and the resin can be excellently formed.

According to the seventh aspect of the present invention, as the valve body can be rotated by the link mechanism, the valve body can be operated by a low intensity of force due to the leverage. That is, a selection is made so that the third passage of the sixth aspect can be communicated with the injecting side passage. Therefore, with respect to a heavy load given when the first passage is shut off from the mold side passage, the valve body can be rotated by a low intensity of force due to the leverage.

According to the eighth aspect of the present invention, in the case where the heating medium is air to heat the primary molding, the discharge passage becomes a discharge passage from which a flow of hot air is discharged into the atmosphere, and the flow of hot air passes through the primary molding so as to heat the primary molding, and then the flow of hot air is discharged from the second passage of the change-over device into the atmosphere. Accordingly, the same effect as that of the sixth aspect of the present invention can be accomplished.

According to the ninth aspect of the present invention, as the temperature sensor is arranged in the second passage, when the heating medium flows into the second passage, the temperature of the heating medium is detected by the temperature sensor, so that the temperature can be controlled. For example, when the resin material is injected into the mold side passage, if the resin material is injected after the temperature of the primary molding, which was heated by the heating medium, has been raised to a predetermined temperature, it is possible to conduct an excellent forming of the resin material without lowering the temperature of the resin material injected from the injection nozzle.

According to the tenth aspect of the present invention, the valve support body and the valve body are arranged facing the mold split face of the forming mold, and the mold side passage and the injecting side passage are divided with respect to the mold split face, and the first passage, the second passage and the third passage are also divided with respect to the mold split face. Therefore, the primary molding can be advantageously subjected to secondary forming.

The present invention may be more fully understood from the description of preferred embodiments of the invention set forth below, together with the accompanying drawings.

DESCRIPTION OF PREFERRED EMBODIMENTS

Next, referring to the drawings, explanations will be given of the method of manufacturing a molding of resin and also of a change-over device for changing over between a heating medium and resin material in secondary forming. In this case, the explanations will be made under the condition that the molding of resin is a hollow intake manifold and the heating medium is a flow of heated air which will be referred to as a flow of hot air hereinafter.

Figure 1:
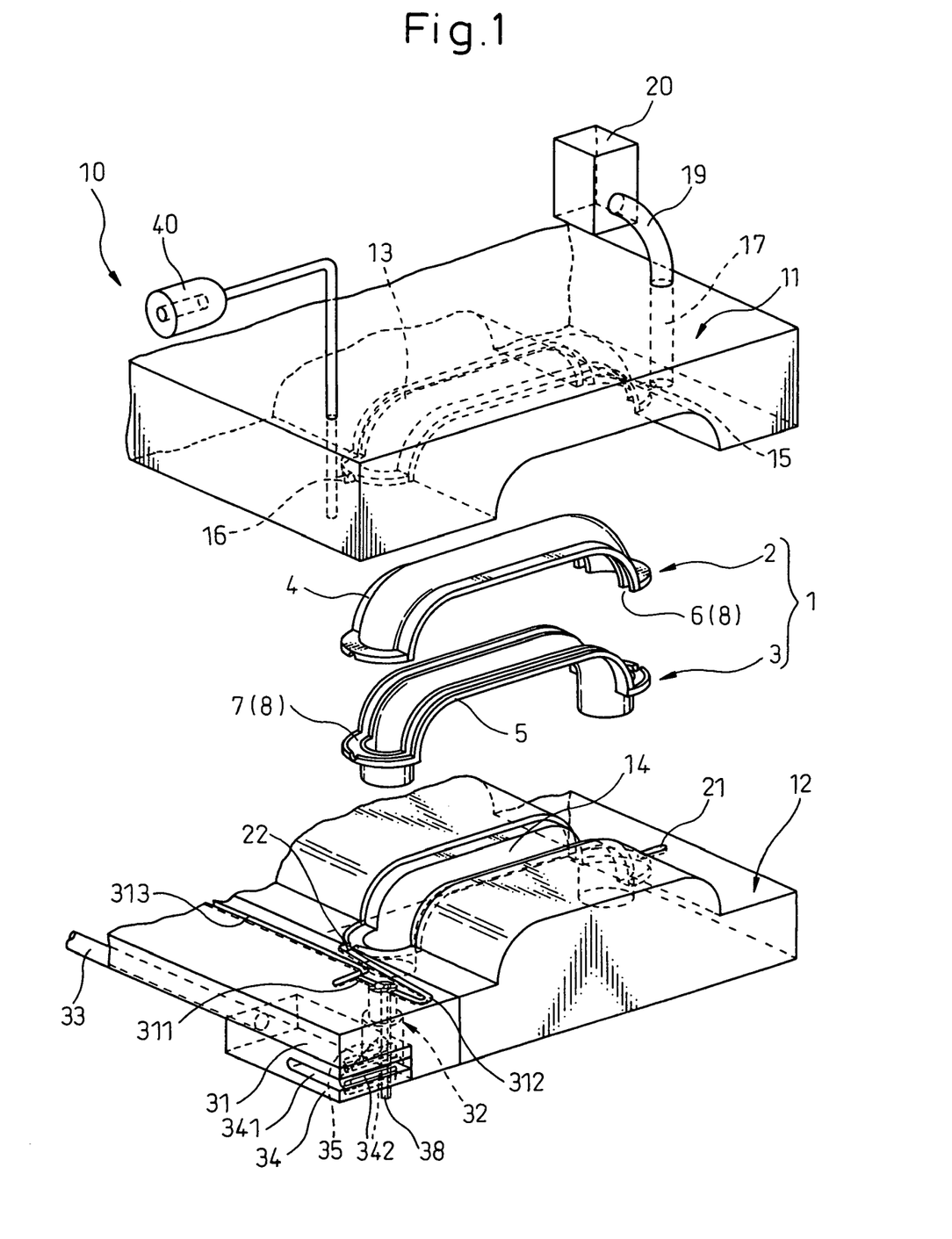
FIG. 1 is an exploded perspective view showing a state in which secondary forming is conducted by the mold for secondary forming of an embodiment of the invention according to the secondary forming method of an embodiment of the present invention.

FIG. 1 is a view showing a state in which the primary moldings 2, 3 of the intake manifold 1, which has been formed by primary molding, are set in the upper mold 11 and the lower mold 12 of the mold 10 for secondary molding. In this case, the mold 10 for secondary forming is used for simultaneously conducting secondary forming on a large number of primary moldings. In FIG. 1, concerning the parts except for the intake manifold 1, only the injecting side passage from the injection nozzle is illustrated in the drawing.

The joint portions 4, 5, for joining the primary moldings 2, 3 to each other, are formed in the respective primary moldings 2, 3. On the joining faces of the joint portions 4, 5, the semicircular pipe-shaped passages 6, 7 are formed on the entire circumferences. The respective pipe-shaped passages 6, 7 are formed into the passage 8 into which the secondary forming resin material, which will be referred to as resin material hereinafter, is injected at the time of joining the primary products 2, 3.

In the upper mold 11, the recess portion 13, into which the primary molding 2 is inserted, is formed into the same shape as that of the primary molding 2, and in the lower mold 12, the recess portion 14, into which the primary molding 3 is inserted, is formed into the same shape as that of the primary molding 3.

At both end portions of the recess portion 13 on the lower face of the upper mold 11, the grooves 15, 16 are formed. The through-hole portion 17 communicated with one groove 15 is formed to penetrate the upper mold 11 from the groove 15 to an upper face of the upper mold 11. The hot air flow generating device 20 is connected to the through-hole portion 17 via the pipe 19.

The grooves 21, 22 are formed at both end portions of the recess portion 14 on an upper face of the lower mold 12. The groove 21 of the lower mold 12 is connected to the groove 15 of the upper mold 11 and also connected to the passage 8 in the mold. The groove 22 is connected to the groove 16 in the upper mold 11 and also connected to the passage 8 in the mold. In this connection, the passage 8 in the mold is formed so that it can be used as a mold side passage.

The change-over device 30 is attached to one end face of the lower mold 12. The change-over device 30 is provided with a change-over valve and is capable of changing over between a flow of hot air, which is sent from the hot air flow generating device 20, and resin material, so that either the flow of hot air or the resin material can be selectively injected into the passage 8.

The change-over device 30 includes: a valve body 32; a valve support body 31 for supporting the valve body 32; a rod 33 connected to a cylinder mechanism not shown in the drawing; a slider 34 attached to a forward end portion of the rod 33; and a drive lever 35 which is a link to be connected to the valve body 32.

The valve support body 31 is attached to one side of the lower mold 12 and arranged so that an upper face of the valve support body 31 can be substantially flush with the upper face of the end portion of the lower mold 12. On an upper face of the valve support body 31, the runner groove 311 for forming an injecting side passage connected to the injection nozzle 40 and the communicating groove 312 capable of being communicated with the groove 22 for forming the mold side passage are opposed to each other while the valve body 32 is being interposed between the runner groove 311 and the communicating groove 312. In this connection, the branch runner groove 313 is connected to the runner groove 311 so that the resin material can be injected from the runner groove 311 to the other parts.

The valve body 32 is pivotally inserted into the valve insertion hole 314 formed between the runner groove 311 and the communicating groove 312. An upper face of the valve body 32 is substantially flush with the upper face of the valve support body 31.

Figure 2:
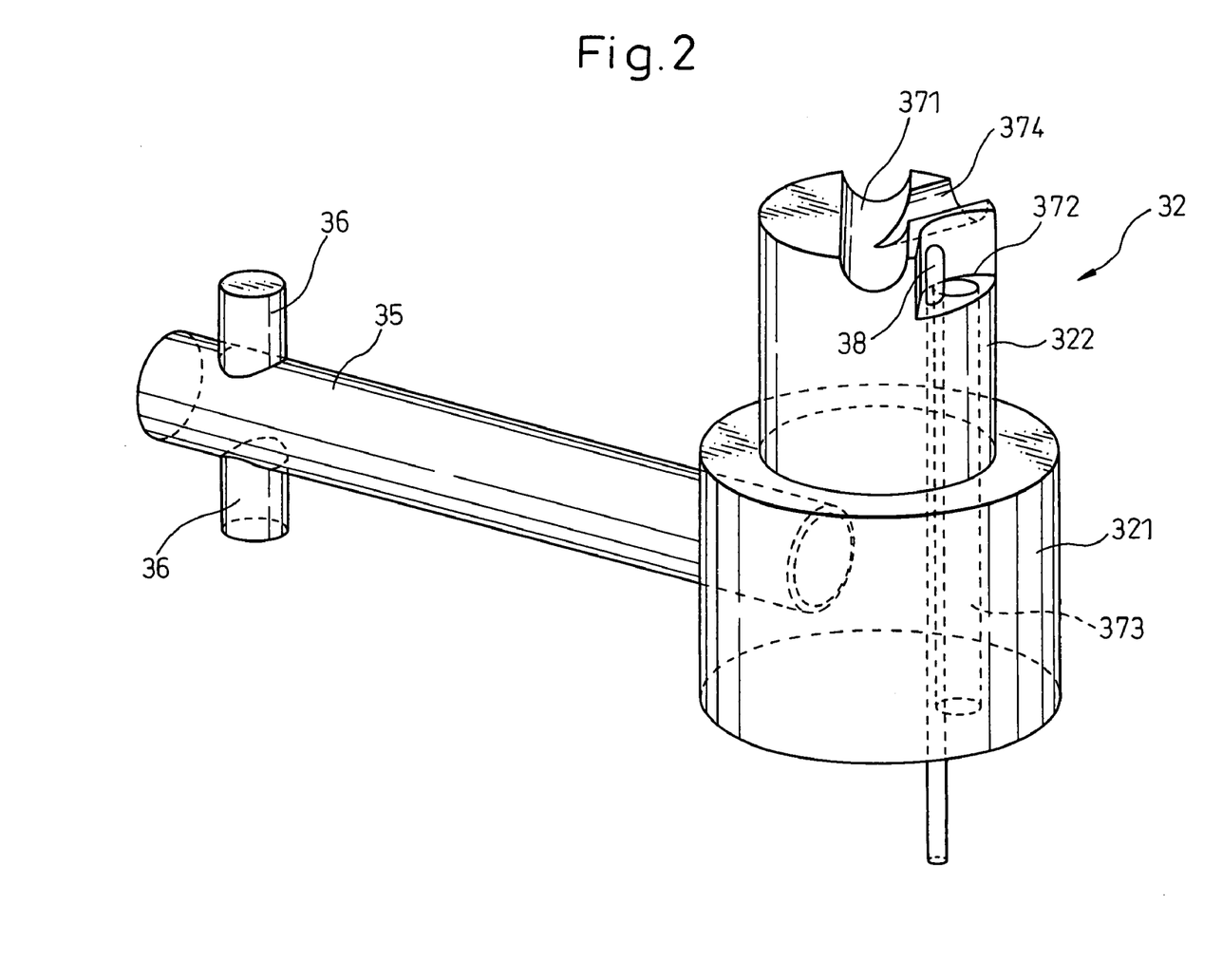
FIG. 2 is a perspective view showing a change-over device of an embodiment of the present invention.

In this embodiment, as shown in FIG. 2, the valve body 32 is formed into a columnar shape having a step portion which includes a large diameter portion 321 and a small diameter portion 322. The drive lever 35 is attached to the large diameter portion 321. The pin portions 36, 36 protruding upward and downward are arranged at the forward end portion of the drive lever 35. The drive lever 35 is inserted into the cutout portion 341 of the slider 34 shown in FIG. 1. The pin portions 36, 36 are inserted into a pair of long groove portions 342, 342. When the slider 34 is moved, the pin portions 36, 36 slide in the long groove portion 342.

On an upper face of the small diameter portion 322, three passages are formed which are moved, by being selectively rotated, between the runner groove 311 and the communicating groove 312. The first passage forms an injection passage 371 which communicates the runner groove 311 with the communicating groove 312 so that the resin material can be injected into the passage 8 provided in the mold. The second passage is an air connecting passage 372, the shape of which is a recess groove shape, formed in the neighborhood of the communicating groove 312 of the injection passage 371 which is the first passage. In the air connecting passage 372, the air discharge passage 373, which is a heating medium discharge passage, and the thermocouple 38, which is a temperature sensor, are arranged. Under the condition that the second passage (the air connecting passage 372) is communicated with the communicating groove 312, the injection passage 371, which is the first passage, and the communicating groove 312 are shut off from each other, and the upper face of the air connecting passage 372 is closed by the upper mold 11. Due to the foregoing, the air discharge passage 373 is communicated with the communicating groove 312, and a flow of hot air, which has flowed into the passage 8 in the mold and heated the side wall face of the passage 8, is discharged from the air discharge passage 373 into the atmosphere. At this time, the temperature inside the recess groove 372 is measured by the thermocouple 38 through the flow of hot air.

The third passage is a runner communicating passage 374 arranged from the central portion of the injection passage 371, which is the first passage, toward the runner groove 311. Under the condition that the runner communicating passage 374 is communicated with the runner groove 311, the injection passage 371 and the communicating groove 312 are shut off from each other.

Next, explanations will be made into the secondary forming method, which is a method of manufacturing this resin molding 1. According to this secondary forming method, before the resin material for secondary forming is injected, a flow of hot air is sent into the passage 8 from the opposite side to the injection nozzle 40 side, and the resin material can be injected while the temperature of the resin material is being maintained in a predetermined temperature range. Further, temperature control is conducted in such a manner that the thermocouple 38 is arranged at a position close to the outlet of the flow of hot air and the temperature in the passage 8 is measured.

Figure 3:
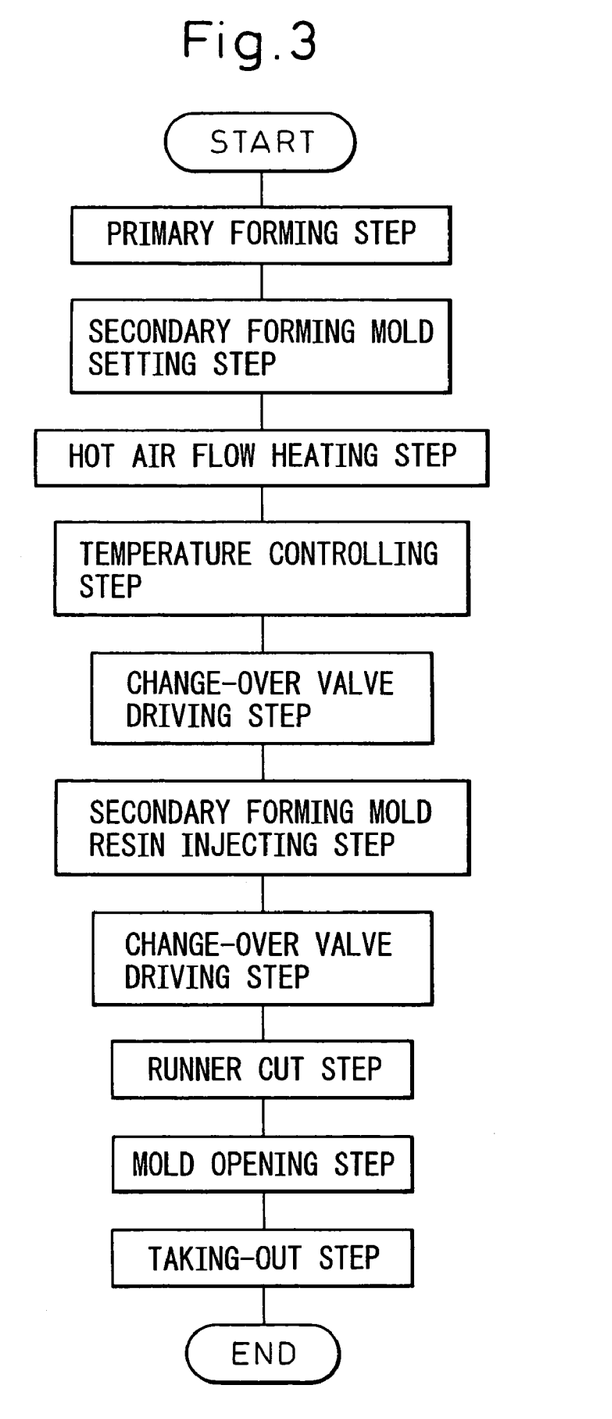
FIG. 3 is a flow chart showing the secondary forming method shown in FIG. 1.

Accordingly, as shown in the flow chart of FIG. 3, the intake manifold 1 is secondarily formed through a primary forming step in which the primary molding is formed, a mold setting step in which the primary molding is set in the secondary forming mold, a hot air flow heating step in which a flow of hot air is flown, a temperature control step in which the temperature of the flow of hot air is actually measured at a position close to the outlet, a change-over valve drive step in which the open passage is changed over by the change-over device, a secondary forming resin injecting step in which the resin material is injected from the injection nozzle, a change-over valve drive step in which the change-over device is driven again, a runner cut step, a mold opening step, and a secondary molding taking-out step.

Figure 4:
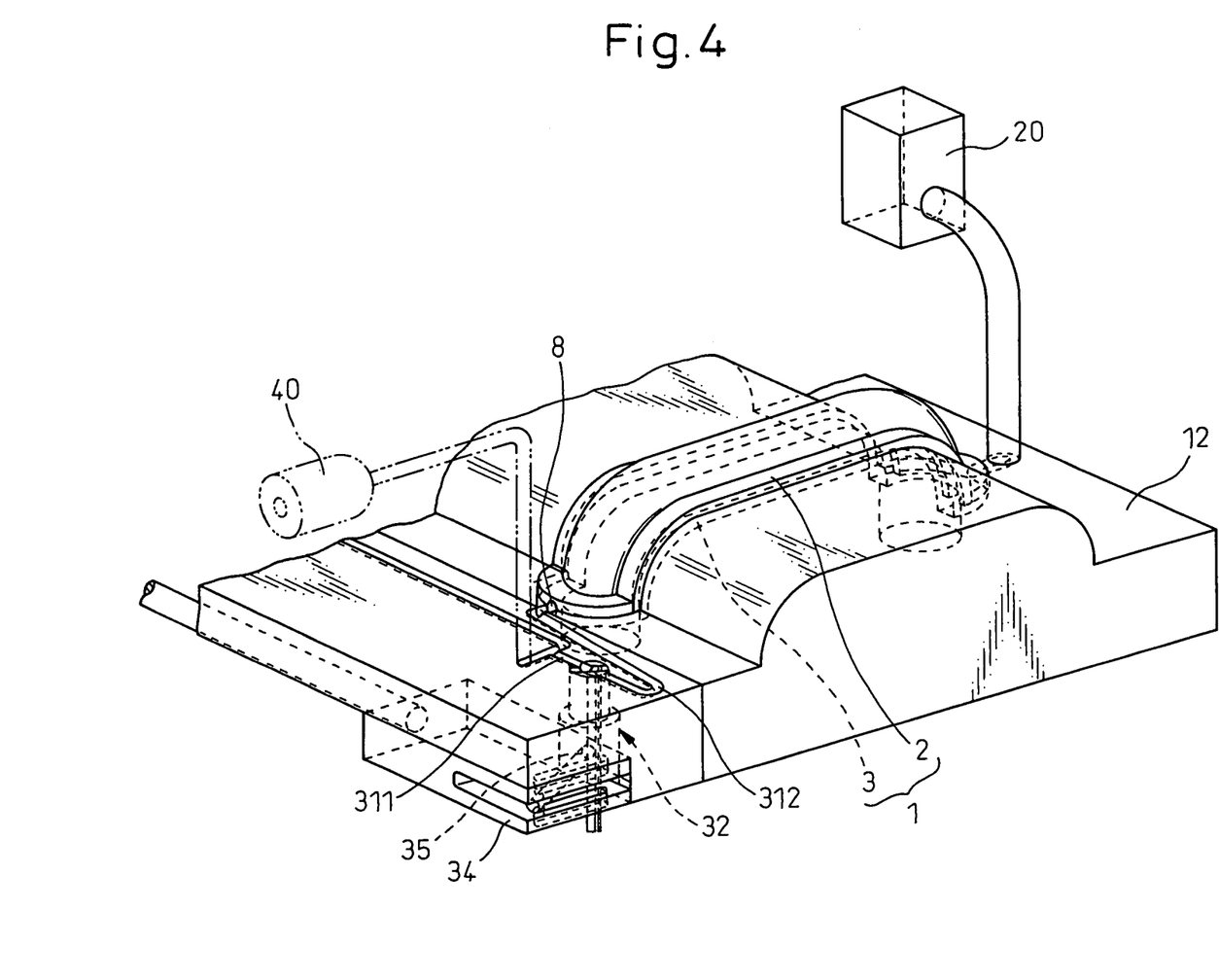
FIG. 4 is a perspective view showing a state in which the mold for secondary forming shown in FIG. 1 is closed.

That is, as shown in FIG. 1, a plurality of primary moldings 2, 3, which have been primarily formed, are respectively inserted into the recess portion 13 of the upper mold 11 and the recess portion 14 of the lower mold 12. Next, as shown in FIG. 4, the upper mold 11 is made to come close to the lower mold 12, and the primary molding 2 and the primary molding 3 are set so that they can be butted against each other. Due to the foregoing, the passage 8 is formed all over the circumference between the joint portions 4, 5 of the respective primary moldings 2, 3 in the mold 10 for secondary forming.

In this connection, in order to plainly show the state of change-over conducted by the change-over device 30, the upper mold is omitted in FIG. 4.

Figure 5:
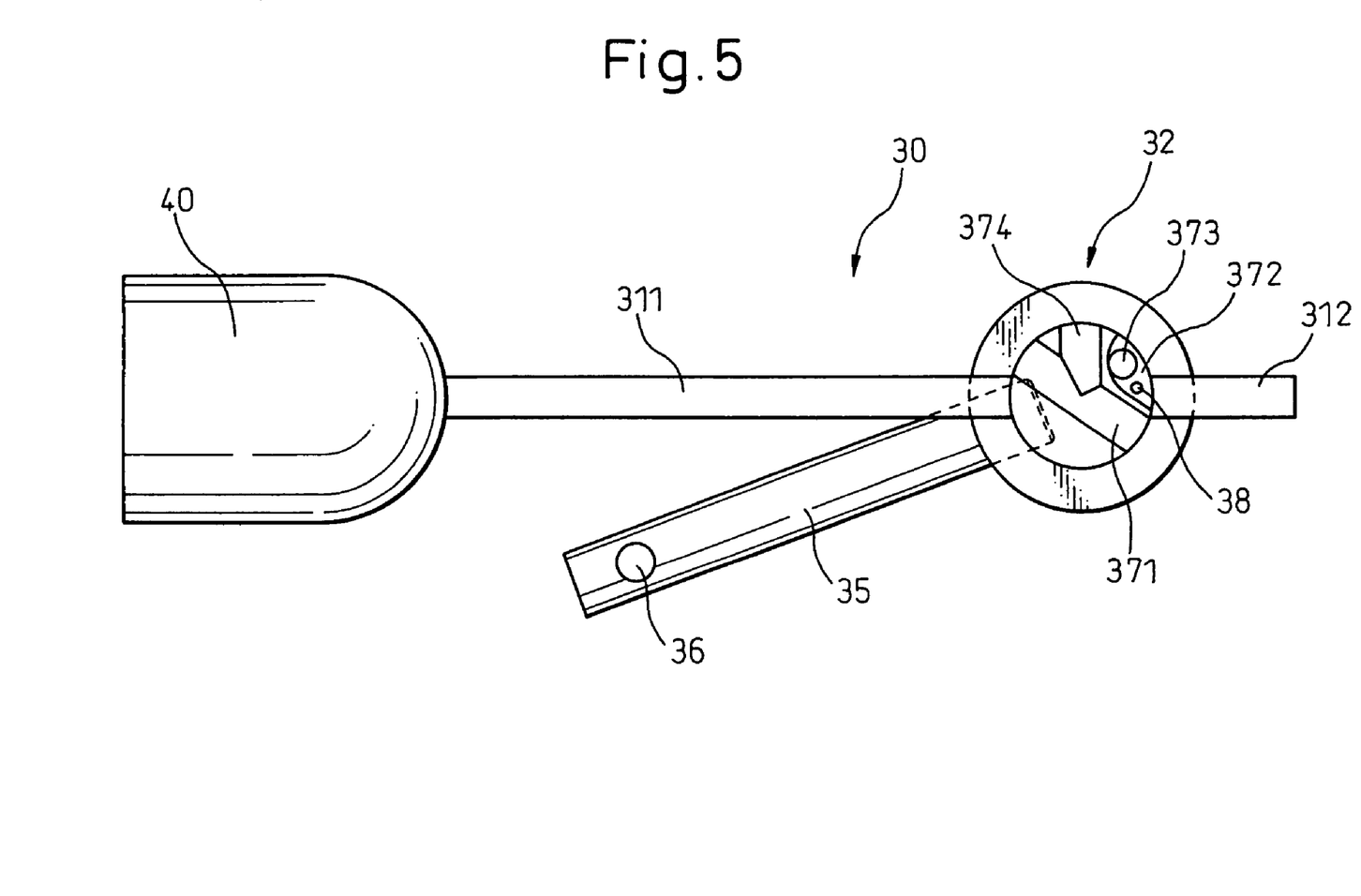
FIG. 5 is a plan view showing a first position of the change-over device in FIG. 2.

In this state, the hot air flow generating device 20 is operated, and a flow of hot air for heating the side wall of the passage 8 is sent from the hot air flow generating device 20. At this time, as shown in FIG. 5, in the change-over device 30, the slide 34 (shown in FIG. 1) is moved to an end portion of the valve support body 31 shown in FIG. 4 when a cylinder, not shown, is operated, so that the valve body 32 can be moved to the first position. That is, when the slide 34 is moved, the pin portion 36 of the drive lever 35 is slid in the long groove portion 342 (shown in FIG. 1) of the slide 34. Due to the foregoing, the drive lever 35 is rotated, and the valve body 32 is rotated to a position where the air connecting passage 372, which is the second passage, is communicated with the communicating groove 312. As the injection passage 371, which is the first passage, is shut off from the communicating groove 312 under the above state, the resin material is not injected into the mold side passage (the passage 8).

When the flow of hot air, which has been heated, flows into the air connecting passage 372, the temperature in the air connecting passage 372 is raised, and the temperature is measured by the thermocouple 38. The flow of hot air is discharged from the air discharge passage 373 into the atmosphere as it is. When the temperature inside the air connecting passage 372 is raised to a predetermined temperature (for example, 100° C.), the slide 34 is moved to the next position.

Figure 6:
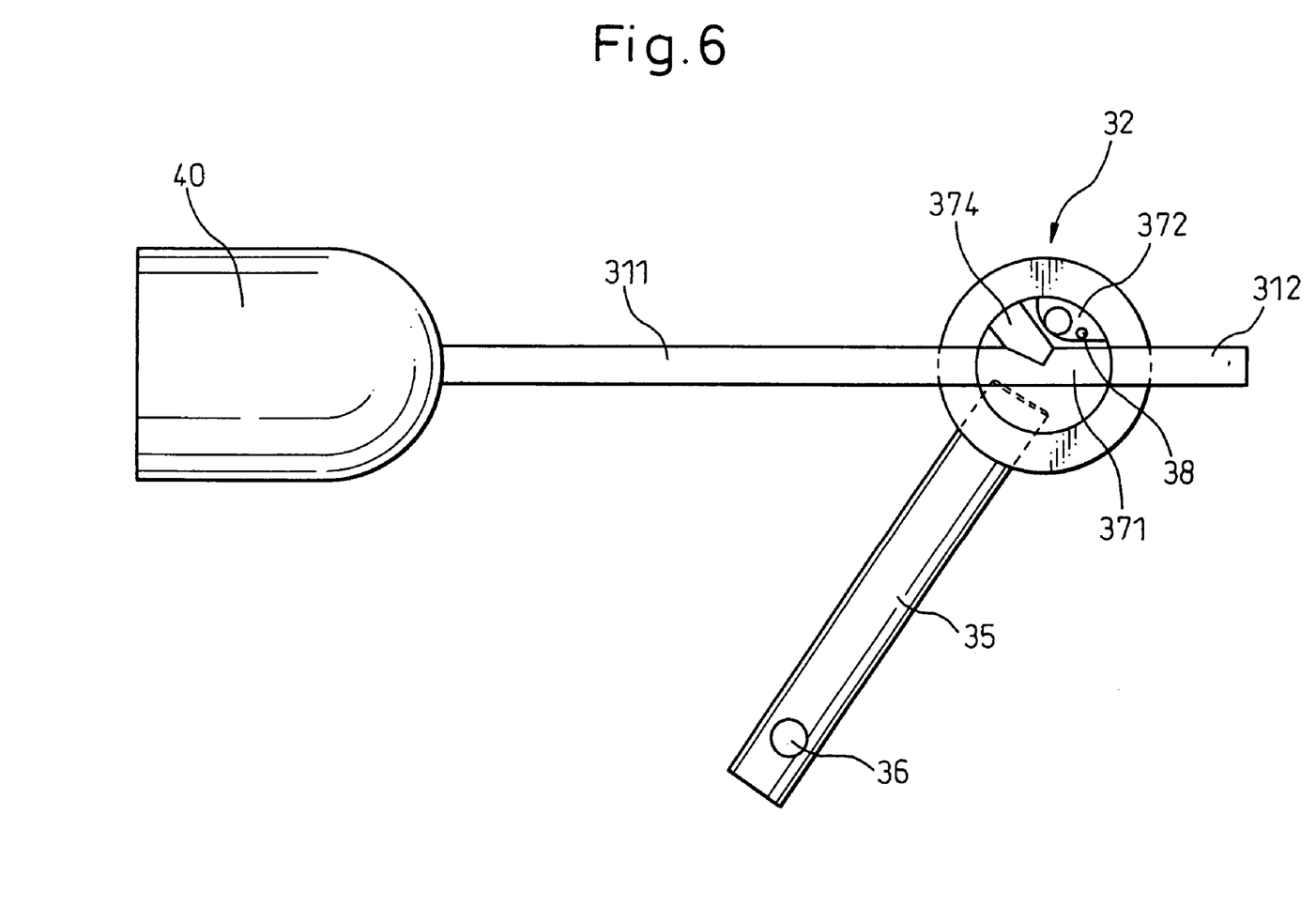
FIG. 6 is a plan view showing a second position of the change-over device.

Next, the slide 34 is moved, and the valve body 32 is moved to the second position by operating the drive lever 35. As shown in FIG. 6, at the second position, the injection passage (the first passage) 371 is communicated with the communicating groove 312. Therefore, under this state, the resin material (for example, at 280° C.) is injected from the injection nozzle 40 into the mold side passage (the passage 8). At this position, the air connecting passage 372, which is the second passage, is closed by the upper mold 11.

At the time of injecting the resin material, a large number of parts are simultaneously formed in this mold 10. Concerning the intake manifold 1 shown in the drawing, the flow length of the resin material is short. Accordingly, the other parts, which are simultaneously injected, are still subjected to the injection process even after the injection of the intake manifold 1 has been completed.

Figure 7:
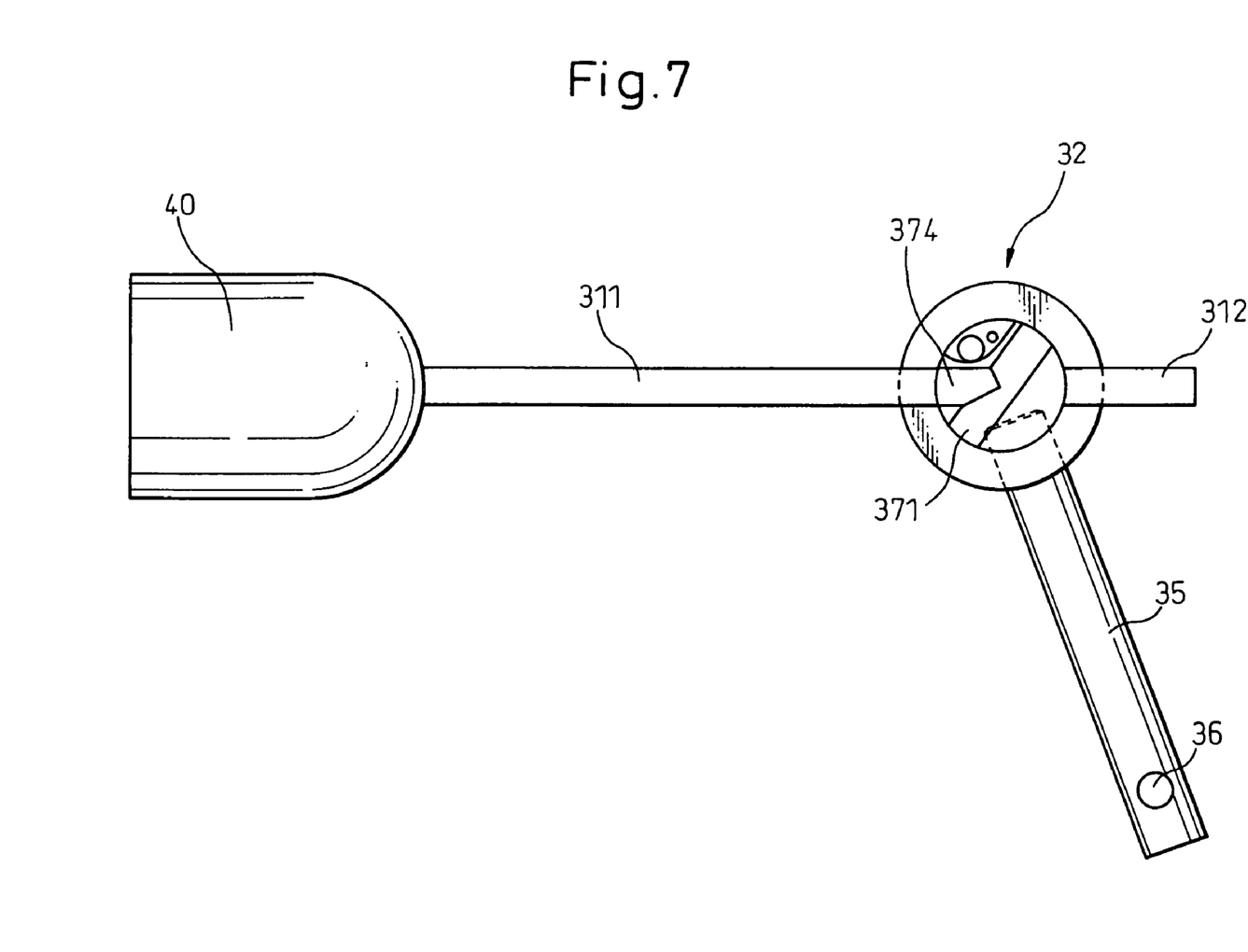
FIG. 7 is a plan view showing a third position of the change-over device.

Therefore, with respect to the intake manifold 1 of the short passage, the flow length of which is short, the valve body 32 is changed-over to the third position. As shown in FIG. 7, at the third position, the runner cut step is conducted. When the valve body 32 is rotated, the resin material, which is connected between the injection passage 371 communicated with the communicating groove 312 and the communicating groove 312, is cut off. When the resin material is cut off as described above, a relatively strong force is required. However, as the pin portion 36 arranged at the forward end portion of the drive lever 35 functions as an operating position, the principle of leverage is applied here. Accordingly, the longer the drive lever is, the lower the intensity of the force required.

When the valve body 32 is rotated and the runner communicating passage 374, which is the third passage, is communicated with the runner groove 311, the dregs of the resin material left in the injection passage 371 are deposited on and joined to the dregs of the resin material left in the runner groove. Due to the foregoing, when ejection is conducted at the time of releasing the mold, the dregs of the resin material in the injection passage 371 can be removed from the mold.

After cooling, the mold is opened, and the product (the intake manifold 1) in which a plurality of primary moldings are integrally formed are taken out from the mold.

As described above, according to the method of manufacturing the resin molding (the intake manifold) 1 of the embodiment, before the resin material for secondary forming is injected, a flow of hot air flows from the end portion on the opposite side to the injection nozzle 40 so that the side wall of the passage 8 in the mold 10 can be heated, and the temperature at a position close to the outlet of the flow of hot air is measured. That is, the thermocouple 38 is arranged in the air connecting passage 372 of the change-over device 30, and the temperature at the position is actually measured so as to control the temperature. Therefore, the injected resin material can be uniformly cured, and the deposition property of the resin material can be enhanced and the deterioration of the deposition strength can be prevented.

As described below, a change-over method different from the change-over method explained above may be adopted.

Figure 8:
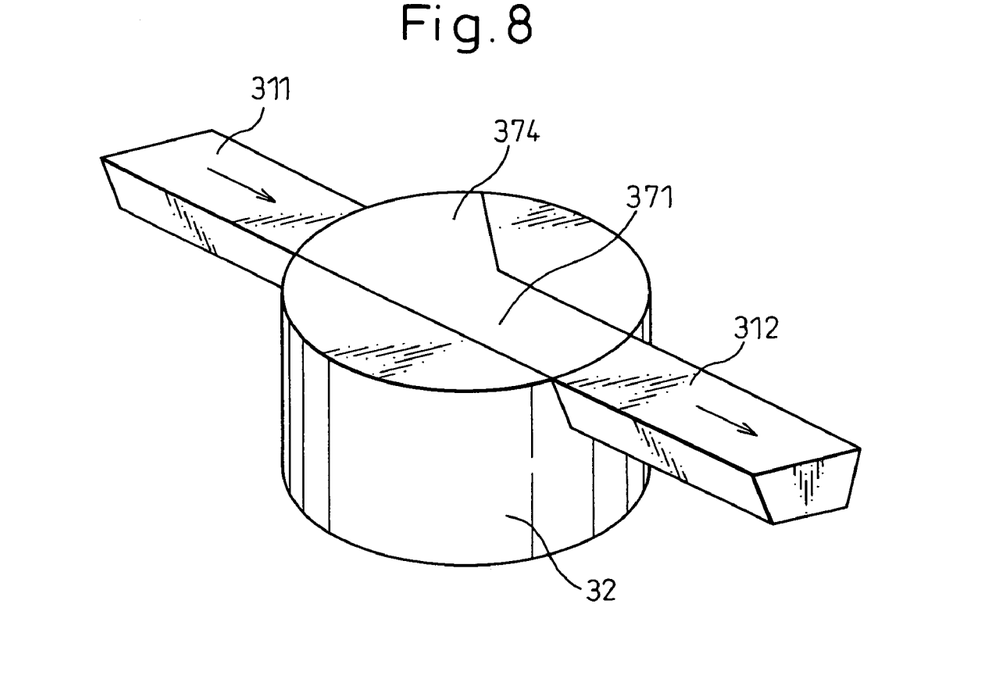
FIG. 8 is a perspective view showing a first position of the change-over device.

First, as shown in FIG. 8, the resin material is injected from the runner groove (the injecting side passage) 311 into the communicating groove (the mold side passage) 312 through the injection passage (the first passage) 371 of the valve body 32. After that, as shown in FIG. 9, when the valve body 32 is rotated, the injection passage (the first passage) 371 and the communicating groove (the mold side passage) 312 are shut off from each other and the injection passage (the first passage) 371 is communicated with the runner groove (the injecting side passage) 311 by the third passage.

Figure 9:
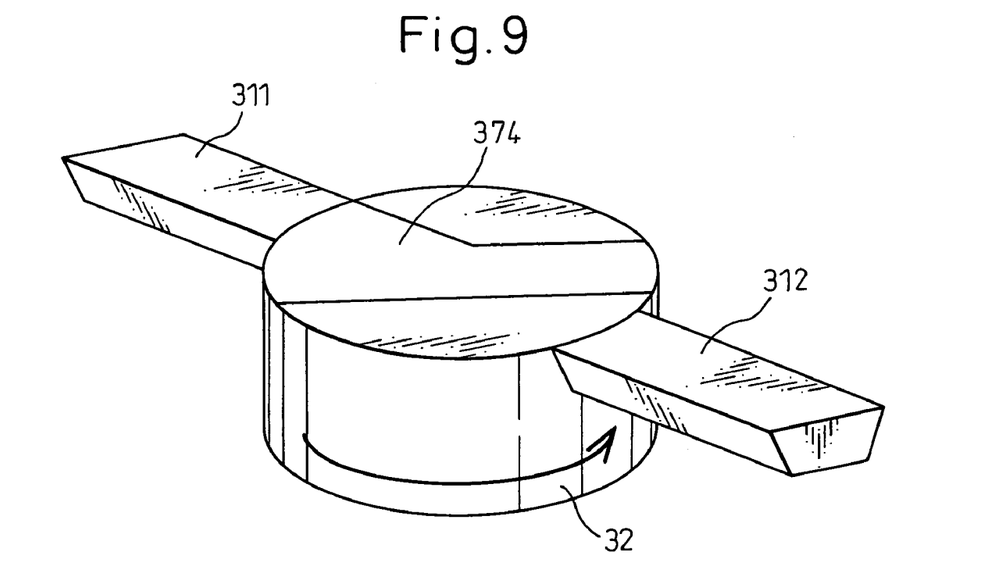
FIG. 9 is a perspective view showing a second position of the change-over device.

However, in the case where the passage is completely shut off as illustrated in FIG. 9, there is a possibility that bubbles are generated in the resin material for secondary forming injected into the joint portion in the primary molding and that the deposition strength of the resin becomes insufficient.

Figure 10:
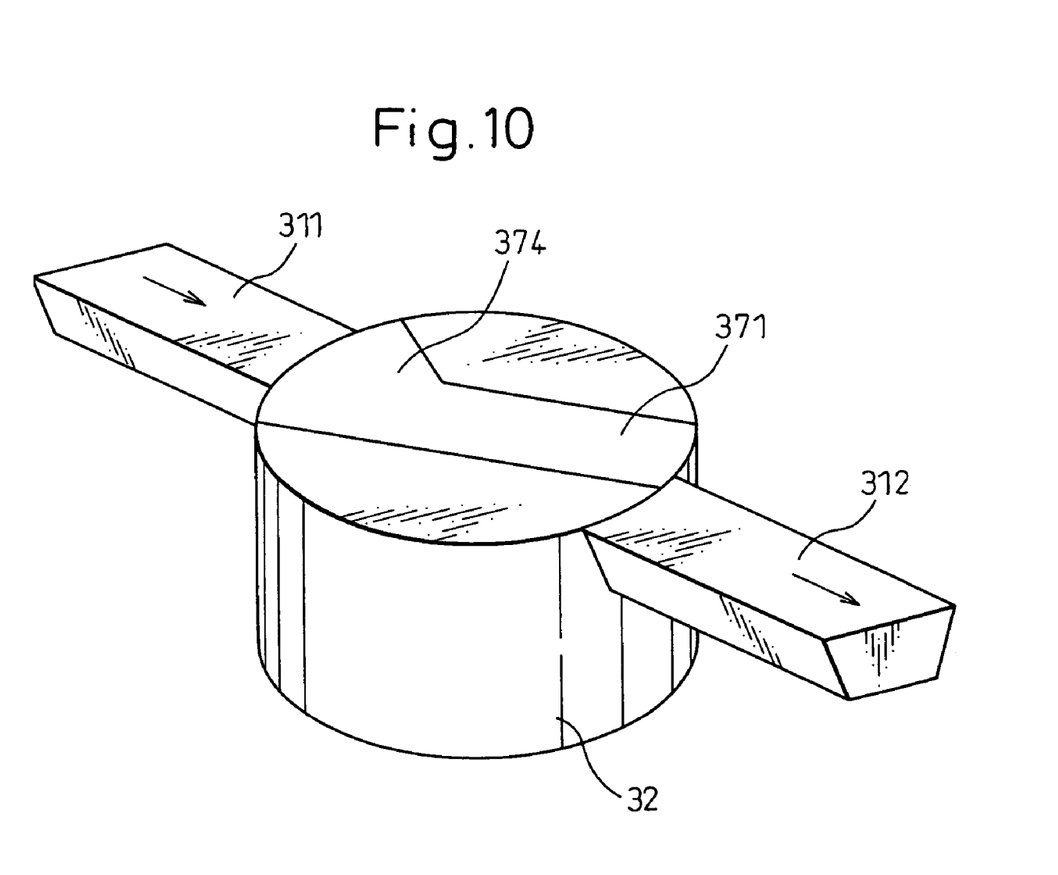
FIG. 10 is a perspective view showing a third position of the change-over device.

In order to avoid the occurrence of the above problems, as shown in FIG. 10, the rotation of the valve body 32 is stopped at a position where the communicating passage (the mold side passage) 312 and the injection passage (the first passage) 371 slightly communicate with each other. When the communication is as described above, it becomes possible to reduce the amount of the flowing resin and it also becomes possible to give a slight injection pressure on the resin. Therefore, the generation of bubbles in the resin material for secondary forming can be prevented.

By the change-over valve (the valve body 32), it is possible to selectively change over between the first passage (the injection passage 371) and either the second passage (the air connecting passage 372) or the third passage (the runner communicating passage 374). Therefore, each process of secondary forming can be easily controlled and the cycle time can be shortened.

Further, when a flow of hot air flows into the passage, before the flow of hot air reaches the injection nozzle 40, it is discharged into the atmosphere. Therefore, the resin material can be excellently formed while the flow of hot air does not reach the injection nozzle 40 so that the temperature of the injection nozzle 40 can not be changed by the influence of the flow of hot air.

In this change-over valve, the runner cut process is provided in which the resin material in the injection passage 371 is cut from the resin material in the mold side passage (the communicating groove 312) and at the same time the injection passage 371 is joined to the injecting side passage (the runner groove 311). Therefore, even when a large number of parts are secondarily formed at the same time, a product, the deposition property of which is excellent, can be formed when the change-over device 30 is arranged in the middle of the molding in the short passage.

In this connection, the change-over device of the present invention is not limited to the above specific embodiment. For example, the heated medium is not limited to heated air. For example, the heated medium may be heated fluid such as heated gas, hot water or hot oil. Further, the thermocouple may be a temperature sensor such as a thermistor.

While the invention has been described by reference to specific embodiments chosen for purposes of illustration, it should be apparent that numerous modifications could be made thereto, by those skilled in the art, without departing from the basic concept and scope of the invention.

The invention claimed is:

1. A method of manufacturing a molding of resin in which a plurality of divided primary moldings are set in a mold for secondary forming and a heating medium and resin material for secondary forming are selectively injected into a passage for resin material for secondary forming in joint portions of the plurality of primary moldings, the method of manufacturing a molding or resin comprising:
   a heating medium flowing step in which the heating medium is made to flow into the passage from a flowing port at one end portion of the passage;
   a resin material injecting step in which the resin material for secondary forming is injected into the passage from an injecting port at the other end portion on the opposite side to the flowing port for the heating medium; and
   a runner cut step in which the injected resin material is cut off before the injecting port in the mold and dregs of the resin material, which has been cut, are connected to a runner on an injection nozzle side.

2. A method of manufacturing a molding of resin according to claim 1, wherein a temperature control step of detecting a temperature in the neighborhood of an outlet of the heating medium is interposed between the heating medium flowing step and the resin material injecting step.

3. A method of manufacturing a molding of resin according to claim 2, wherein a change-over device for selecting either the heating medium flowing step, the resin injecting step or the runner cut step is arranged in the neighborhood of the injecting port for the resin material.

4. A method of manufacturing a molding of resin according to claim 1, wherein a change-over device for selecting either the heating medium flowing step, the resin injecting step or the runner cut step is arranged in the neighborhood of the injecting port for the resin material.

5. A change-over device for changing over between a heating medium and resin material at the time of secondary forming in which joint portions are respectively formed in a plurality of the divided primary moldings, a pipe-shaped passage, which becomes a passage, is formed on a joining face, a secondary molding is formed by injecting resin material for secondary forming into the passage formed when the primary moldings are set in a mold for secondary forming, and the change-over device can change over between an inflow of the heating medium and an injecting of resin material for secondary forming at the time of forming the secondary molding, wherein the change-over device is arranged between a runner, which is connected to an injection port for an injection nozzle and guides the resin material, and a passage formed in the mold, the change-over device for changing over between the heating medium and the resin material at the time of secondary forming comprising:
   a rotary valve body having an injection passage capable of connecting the runner with the passage; a rotating lever for rotating the rotary valve body; and a drive mechanism for driving the rotary lever,
   a rotary valve body including: the injection passage; a heating medium connecting passage having a temperature sensor for detecting an outlet temperature of the heating medium and also having a heating medium discharge passage communicating with an outside of the mold; and a runner communicating passage for connecting the runner with the injection passage at a position wherein the injection passage is not communicated with the passage in the mold, wherein
the change-over device for changing over between the heating medium and the resin material at the time of secondary forming can selectively change over among a first position where the heating medium connecting passage is communicated with the passage in the mold, a second position where the injection passage is communicated with the passage in the mold and a third position where the runner passage is communicated with the runner 6. A change-over device for changing over between a heating medium and resin material at the time of secondary forming according to claim 5, wherein the valve body is attached to one end on a short passage side when a large number of primary moldings, in which either a long passage or a short passage is formed, are simultaneously subjected to secondary forming.

7. A change-over device arranged at a position close to an injecting port for injecting resin material for forming into a mold for forming,
   the change-over device comprising: a valve support member for dividing a mold side passage on a forming mold side and an injecting side passage on an injecting port side; and
   a valve body provided in the valve support member, which can be moved relatively with respect to the mold side passage and the injecting side passage,
   the valve body including:
   a first passage capable of communicating the mold side passage with the injecting side passage;
   a second passage shut off from the injecting side passage, capable of being communicated with the mold side passage, communicated with a discharge passage for the heating medium; and
   a third passage shut off from the mold side passage, capable of communicating with the injecting side passage, wherein
   when the resin material is injected from the injecting port, the valve body is moved so that the mold side passage and the injecting side passage can be communicated with each other by the first passage, and when the heating medium is discharged from the mold side passage, the valve body is moved so that the mold side passage and the injecting side passage can be shut off from each other by the second passage and the mold side passage can be communicated with the discharge passage for the heating medium, and after the resin material is injected into the mold side passage, the valve body is moved so that the first passage and the mold side passage can be shut off from each other and the first passage can be communicated with the injecting side passage by the third passage.

8. A change-over device according to claim 7, wherein the valve body is rotated by a link.

9. A change-over device according to claim 8, wherein the heating medium is heated air which is heated for heating a primary molding arranged in the mold for forming, and the discharge passage is a passage for discharging air, which is the heating medium, into the atmosphere.

10. A change-over device according to claim 8, wherein a temperature sensor for detecting a temperature of the heating medium is arranged in the second passage.

11. A change-over device according to claim 8, wherein the valve support member and the valve body are arranged facing a mold split face of the mold for forming, and the mold side passage, the injecting side passage, the first passage, the second passage, and the third passage are divided between the dividing faces opposed to each other.

12. A change-over device according to claim 7, wherein the heating medium is heated air which is heated for heating a primary molding arranged in the mold for forming, and the discharge passage is a passage for discharging air, which is the heating medium, into the atmosphere.

13. A change-over device according to claim 12, wherein a temperature sensor for detecting a temperature of the heating medium is arranged in the second passage.

14. A change-over device according to claim 12, wherein the valve support member and the valve body are arranged facing a mold split face of the mold for forming, and the mold side passage, the injecting side passage, the first passage, the second passage, and the third passage are divided between the dividing faces opposed to each other.

15. A change-over device according to claim 7, wherein a temperature sensor for detecting a temperature of the heating medium is arranged in the second passage.

16. A change-over device according to claim 15, wherein the valve support member and the valve body are arranged facing a mold split face of the mold for forming, and the mold side passage, the injecting side passage, the first passage, the second passage, and the third passage are divided between the dividing faces opposed to each other.

17. A change-over device according to claim 7, wherein the valve support member and the valve body are arranged facing a mold split face of the mold for forming, and the mold side passage, the injecting side passage, the first passage, the second passage, and the third passage are divided between the dividing faces opposed to each other.

18. A change-over device arranged at a position close to an injecting port for injecting resin material for forming into a mold for forming, the change-over device comprising: a valve support member for dividing a mold side passage on a forming mold side and an injecting side passage on a injecting port side; and a valve body provided in the valve support member, which can be moved relatively with respect to the mold side passage and the injecting side passage, the valve body including:

a first passage capable of communicating the mold side passage with the injecting side passage;

a second passage shut off from the injecting side passage, capable of being communicated with the mold side passage, communicated with a discharge passage for the heating medium; and a third passage shut off from the mold side passage, capable of communicating with the injecting side passage, wherein when the resin material is injected from an injecting port, the valve body is moved so that the mold side passage and the injecting side passage can be communicated with each other by the first passage, and when the heating medium is discharged from the mold side passage, the valve body is moved so that the mold side passage and the injecting side passage can be shut off from each other by the second passage and the mold side passage can be communicated with the discharge passage for the heating medium and after the resin material is injected into the mold side passage, the valve body is moved so that the first passage and the mold side passage can be communicated with each other and the first passage can be communicated with the injecting side passage by the third passage.

* * * * *